J. I. BRORBY.
TRUCK.
APPLICATION FILED DEC. 20, 1918.

1,300,567.

Patented Apr. 15, 1919.

Witness

Inventor,
J. I. Brorby
By Cashow & Co.
Attorneys.

UNITED STATES PATENT OFFICE.

JACOB I. BRORBY, OF SHENANDOAH, IOWA.

TRUCK.

1,300,567.   Specification of Letters Patent.   Patented Apr. 15, 1919.

Application filed December 20, 1918. Serial No. 267,667.

*To all whom it may concern:*

Be it known that I, JACOB I. BRORBY, a citizen of the United States, residing at Shenandoah, in the county of Page and State of Iowa, have invented a new and useful Truck, of which the following is a specification.

This invention relates to trucks for handling barrels, boxes, etc., one of its objects being to provide a truck which can be handled conveniently by one man who, without assistance, can tilt a barrel or the like, place the end of the truck thereunder, and swing the loaded truck down to position where it can be moved easily from place to place. Heretofore it has been necessary, when loading a heavy barrel or the like onto a truck, to have one man tilt the barrel while another placed the end of the truck thereunder. A chock or other holding means has been required to prevent the truck from rolling backward while being lowered with the load thereon. Thus the loading of a truck has been slow and expensive. It is an object of the present invention to avoid the foregoing objections.

With the foregoing and other objects in view, which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1:
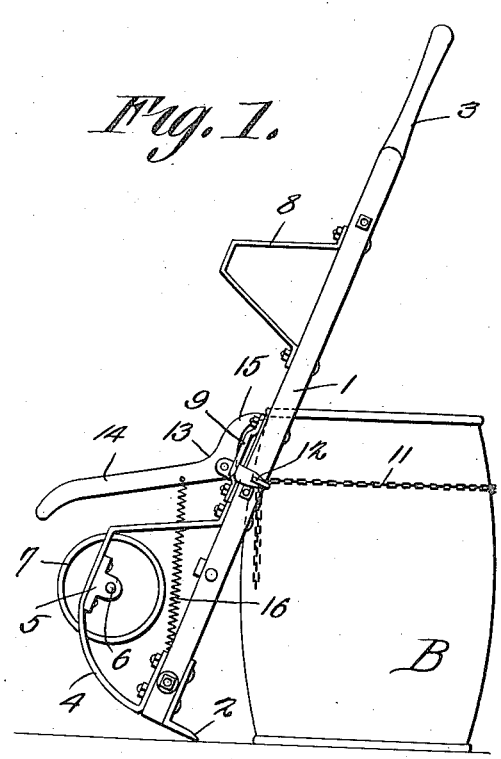
Figure 1 is a side elevation of the truck in position just prior to the loading of a barrel thereon.
Figure 2:
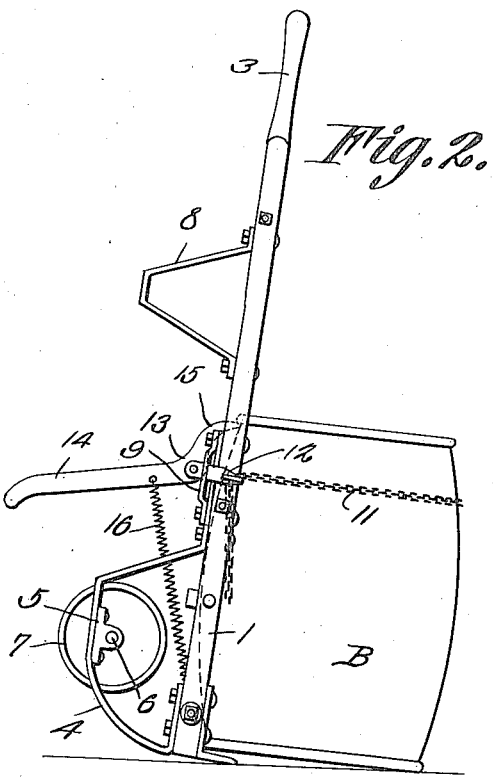
Fig. 2 is a similar view showing the positions of the parts after the end of the truck has been inserted under the barrel.
Figure 3:
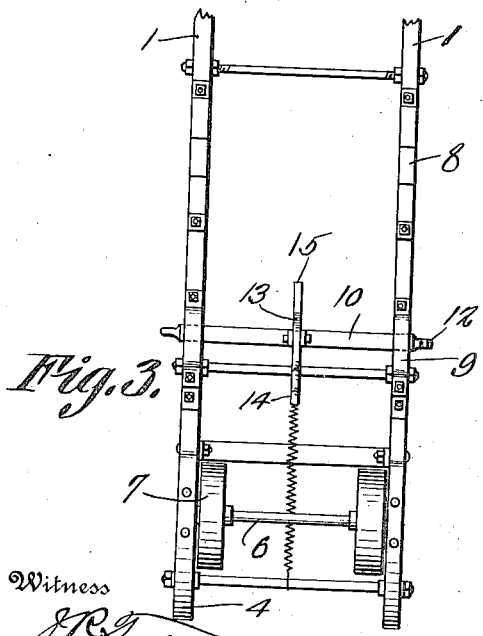
Fig. 3 is an elevation of the elevated truck and showing the bottom structure.
Figure 4:
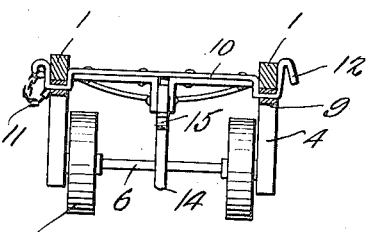
Fig. 4 is a section on line 4—4, Fig. 3.

Referring to the figures by characters of reference 1, designates the body of the truck provided at one end with the usual flange or lip 2 while handles 3 extend from the other end thereof. Rockers 4 extend from that end of the body on which the flange or lip 2 is mounted and are provided with bearings 5 in which is mounted the shaft 6 of the wheels 7 of the truck. Legs 8 extend from the sides of the body near the handles.

Secured to the side portions of the body between the rockers 4 and the legs 8 are guides 9 in which are slidably mounted the end portions of a cross bar 10. One end of a chain 11 is secured to one end of the bar while the other end of the bar has a V-shaped hook 12 adapted to be engaged by one of the links of the chain. A lever 13 is mounted on the bar 10, one arm of this lever forming a handle 14 while the other arm is offset to form a dog 15 adapted to extend between the sides of the body and to engage the load during the loading operation, as hereinafter described. A spring 16 connects the handle 14 to one end portion of the body and serves to hold the lever normally drawn against the axle 6 and out of the way when not in use.

In using the truck it is placed close to the barrel B or other object to be transported and is then tilted so as to rock from the wheels 7 to the end of the body 1, thus to stand in contact with the object B. The chain 11 is then drawn taut about the upper portion of said object and placed in engagement with the hook 12. Lever 13 is swung out of normal position so that the dog 15 will engage the upper portion of the object B as shown in Fig. 1. By now pulling upwardly on the lever 13 it will cause the barrel or other object B to tilt and, as the bar 10 is slidably mounted in the guides 9 said bar will move upwardly within the guides until it reaches the upper portions of the guides whereupon the lower end of the truck will be dragged up to the object B and the lip or flange 2 brought into position beneath said object. By then disengaging the lever 13 from the object B said object will be allowed to settle upon the flange 2 and the truck can be rocked back to lowered position with the load thereon and transported from place to place upon its wheels 7. As the wheels are not in contact with the floor during the loading operation and while the truck is being unloaded, the lower end of the truck will not slip out of place while the object B is being handled.

What is claimed is:—

1. The combination with a load embracing structure and a truck adapted to be supported on end in an inclined position relative to the load by said structure, said truck and structure being slidably connected, of means mounted on the structure for engaging the load to tilt said load and draw the end flange of the truck under the load.

2. The combination with a cross member, of means connected to said member for embracing a load, means mounted on said member for gripping and tilting the object being loaded, and a truck slidably engaged by said member and having an end flange shiftable under the load by the tilting of the load.

3. The combination with a truck having an end flange, of means slidably connected to the truck for embracing an object to be loaded onto the truck and for supporting the truck on end in an inclined position, and means connected to the slidable means for engaging and tilting said object and drawing the flange of the truck under the tilted object.

4. The combination with a truck having an end flange, of a member slidable on the truck, means carried thereby for embracing an object to be loaded on the truck, and means carried by said member for successively engaging said object, tilting it, and drawing the flange of the truck into position under the object.

5. The combination with a truck having an end flange, and guides upon the truck, of a cross member slidable on the guides, means adjustably connected to said member for embracing an object to be loaded onto the truck, and a lever pivoted on said member for engaging and tilting said object and shifting the cross member relative to the guides.

6. The combination with a truck having an end flange, of guides upon the truck, a cross member slidable on the guides, a load engaging member carried by the cross member, a load engaging and tilting lever mounted on the cross member, and yielding means for holding the lever normally in inactive position under the truck.

7. The combination with a truck having an end flange, rockers at said end of the truck, and supporting wheels carried by the rockers, of a cross bar slidably mounted on the truck, a guide therefor, load engaging means adjustably connected to the bar, and means on the bar for engaging the load, tilting it, and drawing the truck flange to position under the tilted load.

In testimony that I claim the foregoing as my own, I have hereto affixed my signature in the presence of two witnesses.

JACOB I. BRORBY.

Witnesses:
A. W. MURPHY,
J. F. LAKE.